United States Patent [19]

Weston

[11] 4,219,438

[45] Aug. 26, 1980

[54] COMPOSITION FOR MARKING AND IDENTIFICATION PURPOSES

[75] Inventor: Norma A. Weston, Annandale, N.J.

[73] Assignee: American Cyanamid Co., Stamford, Conn.

[21] Appl. No.: 178,528

[22] Filed: Dec. 18, 1970

[51] Int. Cl.$^3$ .............................................. C09K 11/02
[52] U.S. Cl. ............................. 252/301.35; 427/157; 427/4
[58] Field of Search ................... 252/301.2 R, 301.35; 117/3, 33.5; 427/4, 157

[56] References Cited

U.S. PATENT DOCUMENTS

| | | | |
|---|---|---|---|
| 3,269,955 | 8/1966 | Rodgers et al. | 252/301.2 R |
| 3,455,856 | 7/1969 | Voedisch et al. | 252/301.2 R |
| 3,489,703 | 1/1970 | Borucki | 252/301.2 R |
| 3,526,627 | 9/1970 | Brooks | 252/301.2 R |
| 3,671,451 | 6/1972 | Butterfield | 252/301.2 R |

Primary Examiner—Stephen J. Lechert, Jr.
Attorney, Agent, or Firm—Frank M. Van Riet

[57] ABSTRACT

This invention relates to compositions of matter useful for marking and identification purposes comprising a toluene, xylene or benzene solvent, a quinazolone fluorescent material and an alkyd resin and a method of marking and identifying objects therewith.

6 Claims, No Drawings

COMPOSITION FOR MARKING AND IDENTIFICATION PURPOSES

BACKGROUND OF THE INVENTION

One of the basic problems which has plagued military personnel over the years has to do with the identification of objects. This problem relates not only to personnel but also to equipment such as trucks, boats, etc. That is to say, in recent years it has become more and more difficult to identify insurgents by their clothing, appearance, etc. and therefore a system of identification whereby it is possible to determine whether a subject in question has come through a specific military zone has become necessary.

It is well known that guerrilla warfare is sustained by hiding caches of ammunition and food in areas which offer good concealment. To prevent this, large areas are placed off-limits by civil authorities. Hence, a need exists for a personnel marking composition that will transfer from foliage to the skin or clothing of anyone who intrudes into a interdicted area. Subsequent examination of a suspect will reveal whether or not he has been in the proscribed area.

One of the basic deficiencies of existing marking compositions (see U.S. Pat. Nos. 3,066,105; 3,162,642) is that when applied to foliage, or after having been applied, when they are contacted with water, i.e. rain, they tend to "flatten out", run or spread on the foliage and are therefore less susceptible to transfer to any metal, clothing, etc. with which they subsequently come in contact.

SUMMARY

I have now discovered a class of compositions which may be applied to various objects, especially foliage, via a multiplicity of methods for purposes of identification and detection of insurgents. My compositions are featured by their tendency to "bead up" or "stand up" on the surface of the object to which they are applied. They have exceptional transfer properties in this condition and are not materially affected by the elements, i.e. rain, snow, etc. As a result, they may be used to protect an area from penetration by personnel etc. for a greater length of time than existing compositions.

Prior art systems such as non-wettable powders and oils, as mentioned above, fail to meet accepted military requirements, as do conventional dyes such as those used to trace the flow of rivers or mark the location of survivors of maritime disasters. The non-wettable powders adhere poorly to the surface of the objects and therefore are easily removed, while the oils tends to penetrate too deeply into porous objects and therefore become undetectable. The dyes are too easily visible by the human eye and therefore objects marked therewith can be easily avoided.

The military requirements for marking compositions are:

(A) They should be substantially invisible to the naked eye;

(B) The mark formed thereby should have a definite and controllable lifetime;

(C) They should be non-toxic to humans, animals and fish;

(D) They should be capable of being easily dispensed and (E) They should be adherent to the object with which they are in contact.

My marking compositions fulfill all of these requirements.

DESCRIPTION OF THE INVENTION INCLUDING PREFERRED EMBODIMENTS

As mentioned above, my novel compositions comprise a xylene, toluene or benzene solvent, a quinazolone fluorescent material and an alkyd resin.

The xylene, benzene and toluene solvents useful in the compositions of the present invention are used to dissolve the resin portion of the compositions and therefore the concentration thereof need be only that sufficient to form a solution of the alkyd resin. Mixtures of the solvents may be used if desired. Small amounts of an aldehyde, i.e. formaldehyde may be used with the other solvent.

The fluorescent material used in my compositions consist of a quinazolone which can be activated by ultraviolet light and which emits in the visible (is colored in the visible region). The fluorescent quinazolone can be utilized in amounts ranging from about 0.1% to about 5.0%, by weight, based on the total weight of the final composition. The fluorescent material is preferably soluble in the solvent and the resinous material but may also be utilized as a suspension therein especially as a solution in N-methyl pyrrolidone; 2-aminoethanol or other known solvent therefore. Examples of suitable fluorescent materials include those quinazolones disclosed in U.S. Pat. Nos. 3,169,129; 3,269,955 or U.S. Pat. No. 3,526,627, which patents are hereby incorporated herein by reference, e.g. 2-(2-hydroxy-3,5-dichlorophenyl)-4(3)-quinazolone; 2-(4-methoxyphenyl)-4(3)-quinazolone; 6-methoxy-2-phenyl-4(3)-quinazolone; 6-butyl-2-(4-methoxyphenyl)-4(3)-quinazolone; 2-(3-hydroxy-2-naphthyl)-quinazolone; 1,2-dihydro-2-(o-methoxyphenyl)-quinazolone; 2-(2-hydroxyphenyl)-quinazolone ethyl carbonate; 2-styril quinazolone; 2-(2-hydroxy-3-nitrophenyl)-4(3)-quinazolone; 2-[2-hydroxy-5-(azophenyl)-phenyl]-4(3)-quinazolone and the like.

The alkyd resin is utilized in amounts ranging from about 5 to 60%, preferably about 10 to 50%, by weight, based on the total weight of the final composition.

The alkyd resins are a series of drying oil modified or fatty acid modified alkyds produced from a saturated polycarboxylic acid and a saturated polyhydric alcohol such as the reaction products of phthalic anhydride, oxalic acid, isophthalic acid, succinic acid or adipic acid with glycerol, pentaerythritol or trimethylol ethane, etc. modified with castor oil, soya bean oil, etc.

The compositions of the instant invention are preferably prepared by mixing the alkyd resin in the xylene, toluene or benzene and forming a solution of the quinazolone and blending the two solutions together. No critical mixing features are necessary. The ingredients may be packaged as two solutions and then merely be suspended before application.

As mentioned above, my novel compositions may be used to mark many objects including humans, equipment such as trucks, boats, guns, ammunition, clothing, but are especially adapted for trees, shrubs and bushes, i.e. foliage, etc.

My novel compositions may be detected after application by merely contacting the object in question with ultraviolet light and examining the contacted area in the dark with the human eye.

The following examples are set forth for purposes of illustration only and are not to be construed as limitations on the instant invention except as set forth in the appended claims. All parts and percentages are by weight unless otherwise specified.

EXAMPLE 1

To a suitable vessel are added 1 part of 2-(2-hydroxy-3,5-dichlorophenyl)-4-(3H)-quinazolone, 2.7 parts of N-methyl pyrrolidone and 0.3 part of 2-aminoethanol. To the resultant solution are added 33.3 parts of a commercially available alkyd resin produced from phthalic anhydride, diethylene glycol, azelaic acid and double A castor oil and dissolved in 61.7 parts of xylene containing 1.0 part of formalin solution. A very fine suspension of the quinazolone in the alkyd solution is recovered.

EXAMPLE 2

Following the procedure of Example 1 except that an equivalent amount of 2-(2-hydroxyphenyl)-6-chloro-4-(3H)-quinazolone is substituted for the quinazolone thereof, a similar composition is produced.

EXAMPLE 3

Again following the procedure of Example 1 except that an equivalent amount of a commercially available alkyd resin produced from sebacic acid, fumaric acid, glycerol, diethylene glycol and castor oil is used in place of the alkyd thereof, a similar composition is produced.

EXAMPLE 4

The procedure of Example 2 is again followed except that 1,2-dihydro-2-(o-methoxyphenyl)-quinazolone is used and the alkyd is dissolved in toluene. A similar marking composition is recovered.

EXAMPLE 5

The procedure of Example 1 is again followed except that an equivalent amount of benzene is used in place of the xylene thereof. A similar marking composition is recovered.

The compositions of Examples 1–5 were sprayed on foliage using a back pack sprayer powered by a small gasoline engine. The compositions "beaded up" on the foliage and did not spread or flatten out thereon even after light rinsing with water for 30 seconds. The marked area was then traversed by a person wearing a typical uniform made from black cotton fabric. Subsequent examination of the clothing in the dark and detection of the markings was made by shining a longwave ultraviolet light, which emits at 3500 Angstroms, on the material. The markings were still observable 4–6 weeks later.

EXAMPLES 6–10

Substitution of a commercially available high-boiling, petroleum derived, high solvency, aromatic hydrocarbon having a boiling point of 450° F. for the xylene, toluene and benzene of Examples 1–5, resulted in compositions which either spread or "flattened out" immediately after application or after slight rinsing with water for 30 seconds.

I claim:

1. A composition of matter useful for marking and identification purposes comprising (A) a xylene, benzene or toluene solvent, (B) a quinazolone fluorescent material and (C) an alkyd resin.

2. A composition according to claim 1 wherein (A) is xylene.

3. A composition according to claim 1 wherein (A) is toluene.

4. A composition according to claim 1 wherein (A) is benzene.

5. The composition of claim 1 wherein (B) is 2-(2-hydroxy-3,5-dichlorophenyl)-4-(3H)-quinazolone.

6. The composition of claim 1 wherein (B) is 2-(2-hydroxyphenyl)-6-chloro-4-(3H)-quinazolone.

* * * * *